(12) United States Patent
Lee et al.

(10) Patent No.: US 10,557,000 B2
(45) Date of Patent: Feb. 11, 2020

(54) METHOD FOR PREPARING OBLATE POLYMER PARTICLE

(71) Applicant: UNIVERSITY-INDUSTRY COLLABORATION & CONSULTING FOUNDATION, Gyeonggi-do (KR)

(72) Inventors: Seong Jae Lee, Gyeonggi-do (KR); Sang Jae Ahn, Gyeongsangnam-do (KR)

(73) Assignee: UNIVERSITY-INDUSTRY COLLABORATION & CONSULTING FOUNDATION, Gyeonggi-do (KR)

( * ) Notice: Subject to any disclaimer, the term of this patent is extended or adjusted under 35 U.S.C. 154(b) by 178 days.

(21) Appl. No.: 15/756,151

(22) PCT Filed: Sep. 18, 2015

(86) PCT No.: PCT/KR2015/009841
§ 371 (c)(1),
(2) Date: Feb. 28, 2018

(87) PCT Pub. No.: WO2017/039050
PCT Pub. Date: Mar. 9, 2017

(65) Prior Publication Data
US 2018/0244872 A1 Aug. 30, 2018

(30) Foreign Application Priority Data
Sep. 4, 2015 (KR) .................. 10-2015-0125414

(51) Int. Cl.
*C08J 5/00* (2006.01)
*C08J 3/12* (2006.01)

(52) U.S. Cl.
CPC . *C08J 5/00* (2013.01); *C08J 3/12* (2013.01); *C08J 2325/06* (2013.01)

(58) Field of Classification Search
CPC .. C08J 5/00; C08J 2325/06; C08J 3/12; B29B 9/16; B29B 13/00; B29B 9/12; B29B 2009/166
See application file for complete search history.

(56) References Cited

U.S. PATENT DOCUMENTS

| | | | | |
|---|---|---|---|---|
| 4,742,507 A * | 5/1988 | Kuroki | ................... | G11B 7/004 360/53 |
| 2010/0311638 A1 | 12/2010 | Tiege | | |
| 2014/0255656 A1* | 9/2014 | Suzuki | ................... | C08L 77/02 428/172 |

FOREIGN PATENT DOCUMENTS

| JP | 05-200267 A | 8/1993 |
|---|---|---|
| JP | 2006-096946 A | 4/2006 |

(Continued)

OTHER PUBLICATIONS

International Search Report for PCT/KR2015/009841.
(Continued)

*Primary Examiner* — Joseph S Del Sole
*Assistant Examiner* — Mohamed K Ahmed Ali
(74) *Attorney, Agent, or Firm* — The PL Law Group, PLLC

(57) ABSTRACT

A method for preparing an oblate polymer particle from a spherical polymer particle includes squeezing a polymer film including spherical polymer particles. A pair of polymer sheets are used to uniformly deform the film. With this method, more uniform oblate particles may be prepared, and a yield rate thereof may be improved.

9 Claims, 6 Drawing Sheets

(56) References Cited

FOREIGN PATENT DOCUMENTS

JP    2007-262334 A    10/2007
JP    2012-224700 A    11/2012

OTHER PUBLICATIONS

Office action dated Feb. 11, 2017 from Korean Patent Office in a counterpart Korean Patent Application No. 10-2015-0125414 (all the cited references are listed in this IDS.) (English translation is also submitted herewith.)
Written Opinion of the International Searching Authority for PCT/KR2015/009841.

* cited by examiner

METHOD FOR PREPARING OBLATE POLYMER PARTICLE

CROSS REFERENCE TO RELATED APPLICATIONS AND CLAIM OF PRIORITY

This application claims benefit under 35 U.S.C. 119 (e), 120, 121, or 365 (c), and is a National Stage entry from International Application No. PCT/KR2015/009841, filed Sep. 18, 2015, which claims priority to the benefit of Korean Patent Application No. 10-2015-0125414 filed in the Korean Intellectual Property Office on Sep. 4, 2015, the entire contents of which are incorporated herein by reference.

TECHNICAL FIELD

The present invention disclosed herein relates to a method for preparing oblate polymer particles, and to oblate polymer particles prepared thereby, and more particularly, to a method capable of preparing uniform oblate particles with an improved yield compared with previously introduced technologies by squeezing a polymer film including spherical polymer particles using two third polymer sheets.

BACKGROUND ART

Non-spherical polymer particles have different rheological properties from spherical particles, thereby being used in many fields, such as being used for a simulation of blood cells in the field of medicine, and being used as an important element in a drug delivery system. Technologies for preparing prolate ellipsoid polymer particles in non-spherical particles have already been introduced in the 1980 s. In these technologies, ellipsoidal particles are prepared from spherical polymer particles, the method of which is to stretch a polymer film including particles. In order to facilitate the deformation of the particle, the temperature is maintained equal to or higher than the glass transition temperature of the particle during the stretching so that the particle is deformed. When the polymer film is stretched using a mechanical device, the particles therein are stretched together. At this time, prolate ellipsoid polymer particles having various aspect ratios may be prepared by controlling the degree of stretching. Afterwards, by applying this technology, various types of non-spherical particles have been prepared by controlling the stretching direction, temperature, and the like. Among them, oblate ellipsoid particles may be used in the medical or advanced materials fields due to the uniqueness of the shape thereof. However, there is a lack of preparation technologies thereof. The technologies introduced so far include an orthogonal stretching method, a film blowing method, and a multi-direction stretching method. All of these technologies apply a technology for stretching a polymer film including particles, and accompany a two-dimensional deformation of the film. So far, various technologies for preparing non-spherical particles from spherical particles have been introduced. However, the biggest problem in these methods is that the yield of non-spherical particles prepared and recovered is significantly low. This is because only a very small amount of particles may be imbedded in a polymer film. It has been reported that among non-spherical particles, oblate ellipsoid particles in particular have a lower yield of particles since it is not possible to obtain uniform particles in the entire region of the film.

The characteristics and disadvantages of the previously introduced technologies for preparing oblate particles are as follows.

First, the orthogonal stretching method shown in FIG. 1 and described in the article by J. A. Champion et al. is a method in which a polymer film including spherical polymer particles is stretched in two vertical directions using a mechanical device. At this time, the temperature is equal to or higher than the glass transition temperatures of the polymer particle and the film. The disadvantages of this method are that oblate particles are obtained only in a region near the center of the film, and the shape of particles becomes more non-uniform as the degree of stretching becomes higher. That is, the deformation of the film in this method appears uniformly only in a certain region in the center of the film, and the shape of the prepared particles differs from the shape of uniform oblate ellipsoids as moving toward the edge from the center of the film.

Next, the film blowing method shown in FIG. 2 and described in the article by Y. Hu et al. is a method in which a polymer film including spherical particles covers the inlet of a funnel and air is blown into the outlet of the funnel to deform the film two dimensionally. During the deformation of the film, the temperature is maintained to be equal to or higher than the glass transition temperatures of the film and the particle. The disadvantage of this method is that while the thickness of the film plays an important role in uniformly deforming the film, a region having different thickness is generated in the film during the injection of air so that the film is deformed non-uniformly in that region, thereby generating non-uniform particles. That is, in this method, the deformation of the to film occurs only by the air injected into the inlet of the funnel, and therefore, the degree of deformation varies depending on the thickness of the film, and the resulting particles are also prepared non-uniformly.

Lastly, the multi-direction stretching method shown in FIG. 3, and described in the article by H. Shin et al. is a method in which a polymer film including spherical particles is simultaneously stretched in 8 to 12 directions using a mechanical device. During the stretching, the temperature is maintained to be equal to or higher than the glass transition temperatures of the particle and the film. This method is capable of preparing uniform oblate ellipsoid particles compared with other methods. However, there is the disadvantage in that uniform particles may be obtained only in a range of 60 to 80% of the film from the center of the film. This method is similar to the orthogonal stretching method described above except that additional stretching directions are added thereto so that the stretching is performed in 8 to 12 directions. As a result, more portions of the film are uniformly deformed compared with the orthogonal stretching method. However, this method also has the disadvantage in that uniform deformation occurs only in a range of about 60 to 80% of the entire region of the film.

Therefore, there is a very high demand in the industry for a method capable of preparing oblate polymer particles having uniform shape with high yield.

SUMMARY

The present invention is devised to solve the above problem in that uniform particles are not obtained in the entire film, and provides a method for preparing oblate polymer particles, the method capable of preparing uniform oblate particles with an improved yield compared with previously introduced technologies by squeezing a to polymer film including spherical polymer particles using two third polymer sheets.

The present invention also provides oblate polymer particles prepared by the above method.

In accordance with an embodiment of the present invention, a method for preparing oblate polymer particles, comprising the steps of:

(A) preparing first spherical polymer particles;

(B) preparing a second polymer film including the first spherical polymer particles;

(C) adhering two third polymer sheets to both sides of the second polymer film to form a multi-layer structure of 'the third polymer sheet-the second polymer film-the third polymer sheet';

(D) heating the multi-layer structure to a temperature equal to or higher than the highest temperature of the respective glass transition temperatures of the first polymer particle, the second polymer film, and the third polymer sheet, and lower than the lowest temperature of the respective melting temperatures thereof;

(E) squeezing in a direction perpendicular to each third polymer sheet and toward the second polymer film of the multi-layer structure to deform the first polymer particles into oblate shape; and (F) dissolving the second polymer film in a solvent to obtain the first polymer particles of oblate shape.

In addition, a method for preparing oblate polymer particles may further comprise, after the step (E) but before the step (F), a step of cooling the multi-layer structure to a temperature lower than the lower temperature of the respective glass transition temperatures of the first polymer particles and the second polymer film.

In addition, the third polymer sheet may be an elastic sheet.

In addition, in the multi-layer structure, the thickness of the third polymer sheet may be 0.1 to 100 times, preferably 0.5 to 50 times, more preferably 1 to 10 times the thickness of the second polymer film.

In addition, the thickness of the second polymer film after the squeezing in the step (E) may be 5 to 95%, preferably 10 to 90%, more preferably 17 to 83% of the thickness before the squeezing.

In addition, the solvent of the step (F) may be insoluble in the first polymer and soluble in the second polymer.

In addition, the solvent of the step (F) may be water.

In addition, the third polymer may be the same as the second polymer.

In accordance with another embodiment of the present invention, oblate polymer particles may be prepared by the preparation method.

A method for preparing oblate polymer particles of the present invention is a method in which a second polymer film including first spherical polymer particles is squeezed using third polymer sheets. The present invention uses two third polymer sheets for the uniform deformation of the second polymer film so that uniform oblate particles may be prepared in the entire region of the second polymer film compared with previously introduced technologies for preparing oblate polymer particles, and as a result, the yield is also improved. Furthermore, the present invention has a high reproducibility of the squeezing aspect of a second polymer film, and while in the conventional technologies, only a circular second polymer film can be used, but since there is no limitation in the shape in the present invention, a second polymer film having various shapes such as a square shape may be used.

DETAILED DESCRIPTION

In the present invention, the term, 'oblate' refers to a disk shape in which a spherical shape is flattened.

In the present invention, the term, 'axial ratio' refers to, with respect to the multilayer structure of 'third polymer sheet-second polymer film-third polymer sheet', a value obtained by dividing the thickness of the structure after the squeezing by the thickness of the structure before the squeezing In the present invention, the term, 'aspect ratio' refers to a value obtained by dividing the thickness of an oblate particle by the diameter thereof, and the term, 'inverse aspect ratio' refers to the reciprocal of the aspect ratio.

Hereinafter, preferred embodiments of the present invention will be described in detail. Also, in the following description, numerous specific details are set forth, such as a specific component, in order to provide a more thorough understanding of the present invention. However, it will be apparent to those skilled in the art that the present invention may be practiced without these specific details. In addition, when describing the present invention, a detailed description of the related known functions and configurations incorporated herein will be omitted when it may make the subject matter of the present invention rather unclear.

A method for preparing oblate polymer particles of the present invention begins with a step of preparing first spherical polymer particles. The first polymer particles have spherical shape before being deformed into polymer particles to be finally obtained by deforming the shape into oblate shape. A polymer to be used as a material of the first polymer particles is not particularly limited, and examples thereof may include polystyrene (PS), polymethyl methacrylate (PMMA), copolymers of each of the polystyrene (PS) and the polymethyl methacrylate (PMMA), a polymer weakly crosslinked using a crosslinking agent such as divinyl benzene (DVB).

Next, a second polymer film including the first spherical polymer particle is prepared. The second polymer film evenly transmits the force generated by squeezing to be described later to the first polymer particles to cause the first polymer particles to be deformed from being spherical to oblate. In this case, in order to facilitate the separation of the first polymer particles whose shape deformation is completed from the second polymer film, the first polymer particles and the second polymer film need to be different in solubility to a particular solvent. A polymer to be used as a material of the second polymer film is not particularly limited, and examples thereof may include polyvinyl alcohol (PVA) and polydimethylsiloxane (PDMS).

Figure 1:
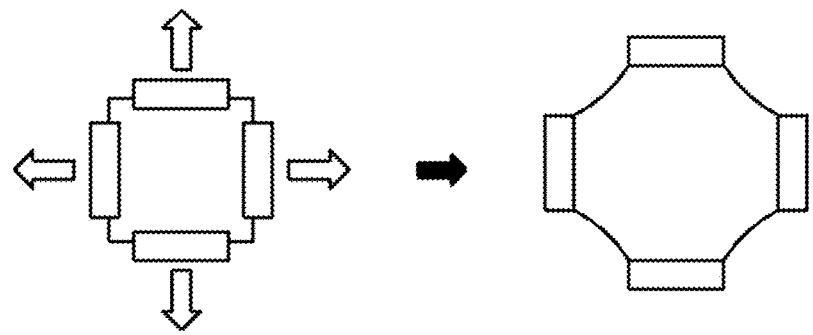
FIG. 1 is a schematic diagram of a conventional orthogonal stretching method.
Figure 2:
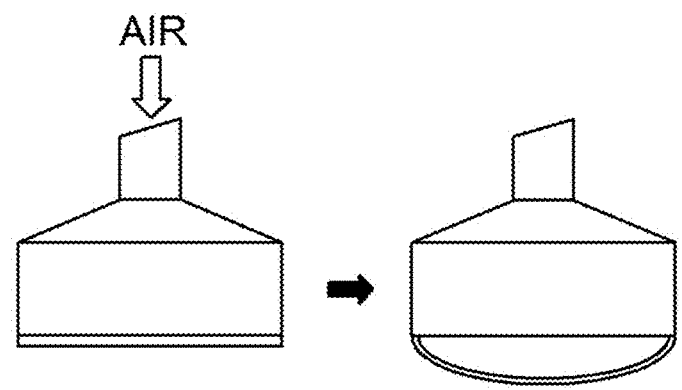
FIG. 2 is a schematic diagram of a conventional film blowing method.
Figure 3:
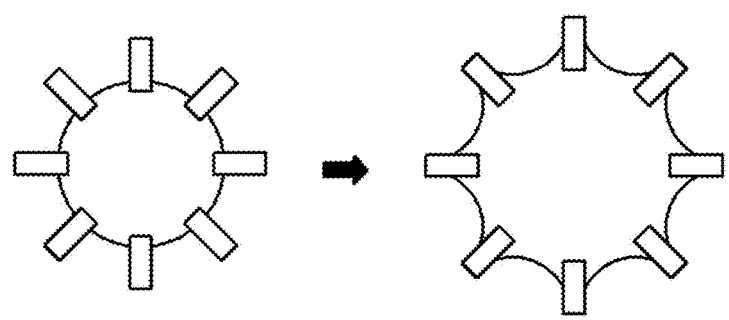
FIG. 3 is a schematic diagram of a conventional multi-direction stretching method.
Figure 4:
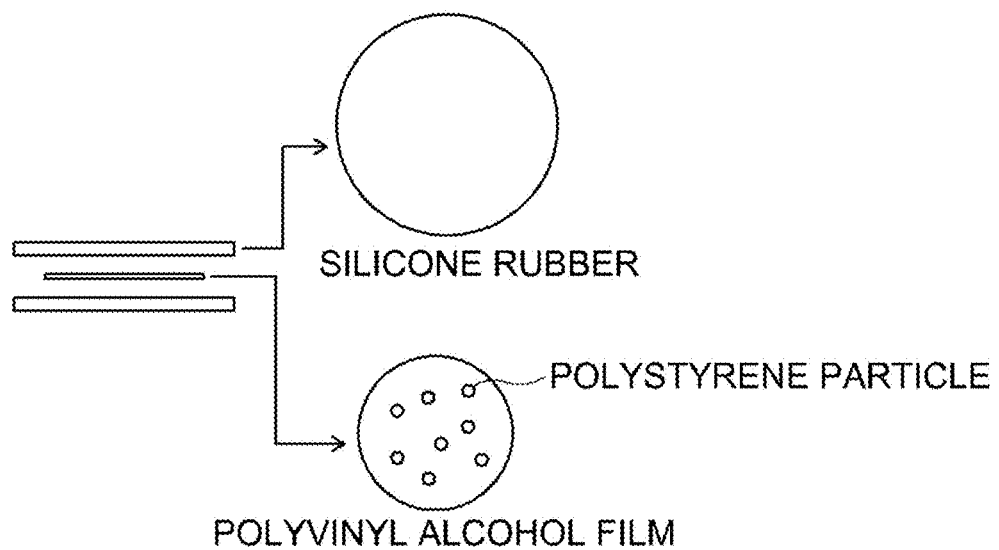
FIG. 4 is a schematic diagram of a multilayer structure of 'third polymer sheet-second polymer film-third polymer sheet'.
Figure 5:
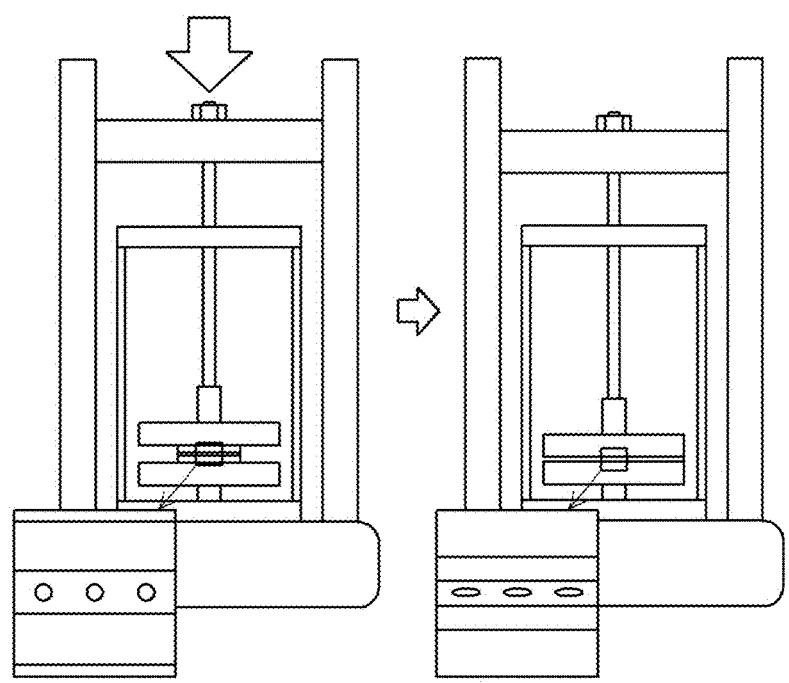
FIG. 5 is a schematic diagram showing a step of squeezing the multilayer structure of the present invention using a universal testing machine and a high-temperature chamber.

A third polymer sheet is then closely adhered to both sides of the second polymer film prepared as described above to form a multilayer structure of 'third polymer sheet-second polymer film-third polymer sheet' as shown in FIG. 4. FIG. 4, which is the core of the present invention, shows a second polymer film including the first spherical polymer particles placed between two third polymer sheets. It is more preferable that the two third polymer sheets are elastic sheets because a third polymer sheet is easily deformed when it has elasticity so that the third polymer sheet deforms the second polymer film included therein together when squeezed and deformed.

A polymer to be used as a material for the third polymer sheet is not particularly limited, and examples thereof may include silicone rubber and the like. Also, a polymer to be used as a material of the third polymer may be the same polymer as the second polymer film. In this case, the second polymer film has the same physical properties as the third polymer sheet so that the deformation thereof will proceed in the same manner. Thus, it becomes possible to transfer the pressure received by the third polymer sheet to the second polymer film, and further to the first polymer particles.

In addition, in the multilayer structure, the thickness of the third polymer sheet may be 0.1 to 100 times, preferably 0.5 to 50 times, more preferably 1 to 10 times the thickness of the second polymer film. When the thickness of the third polymer sheet is within the above range, the second polymer film and the first polymer particles may be sufficiently deformed without being restricted by the third polymer sheet, and the squeezing force may be sufficiently transferred to the second polymer film and the first polymer particles.

Furthermore, in the multilayer structure, the edge of the third polymer sheet may correspond to the edge of the second polymer film, or include the edge of the second polymer film, and the area of the third polymer sheet may be 1 to 10 times, preferably 1 to 5 times, more preferably 1 to 2 times the area of the second polymer film. When the area of the third polymer sheet is within the above range, the edge of the second polymer does not protrude out of the edge of the third polymer sheet during the squeezing so that uniform shape deformation may be expected, and the third polymer sheet may be prevented from being unnecessarily enlarged, thereby ensuring economic efficiency.

Subsequently, the multilayer structure is heated to a temperature equal to or higher than the highest temperature of the respective glass transition temperatures of the first polymer particles, the second polymer film, and the third polymer sheet, and lower than the lowest temperature of the respective melting temperatures thereof. Through this, the brittleness of all of the polymers may be reduced so that cracking of a surface during the shape deformation may be prevented, and the operation cost may be reduced since the squeezing is more easily performed. It is more preferable that such heating is performed in a high-temperature chamber capable of maintaining isothermal temperature.

After the multilayer structure is exposed at a high temperature for a sufficient time, the multilayer structure is squeezed in a direction perpendicular to each third polymer sheet of the multilayer structure and in a direction toward the second polymer film to deform the first polymer particles into oblate shape. The squeezing is performed using a universal testing machine or a press, and at this time, the second polymer film and the first polymer particles are deformed through a uniaxial squeezing force.

The thickness of the second polymer film after the squeezing may have various values according to a desired shape of the first polymer particles. In order to maintain the shape deformed into an oblate shape and to prevent cracking due to excessive squeezing, the thickness of the second polymer film after the squeezing may be 5 to 95%, preferably 10 to 90%, more preferably 17 to 83% of the thickness before the squeezing.

The first polymer particles whose shape is deformed into oblate shape is obtained by dissolving the second polymer film including the first polymer particles in a solvent. At this time, a solvent used in this case may preferably be insoluble in the first polymer and soluble in the second polymer as described above. Also, when the second polymer is water-soluble, the solvent may be water.

Furthermore, a method for preparing oblate polymer particles of the present invention may further include, after the squeezing but before the dissolving, a step of cooling the multi-layer structure to a temperature lower than the lower temperature of the respective glass transition temperatures of the first polymer particles and the second polymer film. Through this, the first polymer particles whose shape has once been deformed into oblate shape is stabilized so that an additional deformation of the shape thereof may be prevented.

In the meantime, oblate polymer particles of the present invention are characterized by being prepared by the above preparation method.

Hereinafter, embodiments of the present invention will be described.

EXAMPLE

Example Step 1: Preparation of Polystyrene Particles

As a preparation material for preparing oblate particles of different sizes, spherical polystyrene particles of different sizes (average diameter $D_S$=530 nm, $D_M$=1.9 µm, $D_L$=4.3 µm) were synthesized.

Monodisperse polystyrene microspheres ($D_S$) of submicron size were synthesized by emulsifier-free emulsion polymerization. 40 ml of purified styrene monomer (Samchun Chemical Co., Ltd., Korea) and 0.3676 g of potassium persulfate (KPS, Aldrich, USA) were added into a three-neck double jacket reactor (equipped with a stirrer, a reflux condenser, and a nitrogen inlet) containing 43.2 ml of ethanol and 360 ml of distilled water. The polymerization was performed at a stirring speed of 300 rpm, and at 70° C. for 24 hours.

Polystyrene microspheres ($D_M$ and $D_L$) of micron size were synthesized by dispersion polymerization. The polystyrene microspheres ($D_M$) were prepared by introducing 40 g of styrene and 1.6 g of polyvinyl pyrrolidone (PVP) (Mw=1,300,000 g/mol, Aldrich, USA) into a reactor containing 200 g of isopropanol (Duksan Chemical Co., Korea) and 10 g of distilled water. The polymerization was performed at a stirring speed of 120 rpm, and at 70° C. for 24 hours in the presence of 0.4 g of 2,2'-azobisisobutyronitrile (AIBN) (Daejung Chemicals & Metals, Korea). The polystyrene microspheres ($D_L$) were prepared with 40 g of styrene, 1.6 g of polyvinyl pyrrolidone (PVP) (Mw=40,000 g/mol), and 210 g of n-butanol (Duksan Chemical Co., Korea). The polymerization was performed under the same conditions as the synthesis of the polystyrene microspheres ($D_M$).

Example Step 2: Preparation of a Film

A polyvinyl alcohol film containing the polystyrene particles was prepared by the following method.

First, polyvinyl alcohol (average molecular weight: 146,000-186,000 g/mol, Aldrich, USA) was dissolved in distilled water for 4 to 5 hours at 80° C. using a magnetic stirrer. After being cooled to room temperature, the polyvinyl alcohol aqueous solution was added by 0.1 wt % of the polystyrene microspheres of Example 1. The homogeneously dispersed mixture was poured into an aluminum tray of 29×19 cm², and water was slowly evaporated at room temperature. After the mixture is dried for 36 to 48 hours, a flexible polyvinyl alcohol film containing the polystyrene microspheres was obtained. The prepared film was cut into circles having a diameter of 3.5 to 6.5 cm to prepare oblate particles.

Example Step 3: Preparation of Oblate Particles Through Uniaxial Squeezing

A circular polyvinyl alcohol film containing polystyrene microspheres was interposed between two circular silicone rubber sheets (HSW, Korea) of a thickness of 3 mm. The three-layer structure of 'silicone rubber sheet-polyvinyl alcohol film-silicone rubber sheet' was placed on a squeezing plate of a universal testing machine (Lloyd, UK) at a chamber temperature of 135° C., which is equal to or higher than the glass transition temperature (85° C.) of the polyvinyl alcohol film and the glass transition temperature (106° C.) of the polystyrene particles. In consideration of the low thermal conductivity of the silicone rubber sheet, pre-heating was sufficiently performed until a predetermined temperature was reached. Oblate polymer particles were prepared in a squeezing range of an axial ratio of 17 to 83%. The squeezed film was cooled to room temperature in a deformed state. The cooled film was dissolved in distilled water at 80° C. to remove polyvinyl alcohol therefrom. In order to obtain oblate particles from which the polyvinyl alcohol was removed, centrifugation and washing were repeatedly performed for about 7 to 8 times.

Test Example 1: Scanning Electron Microscope (Sem) Analysis

Figure 6:
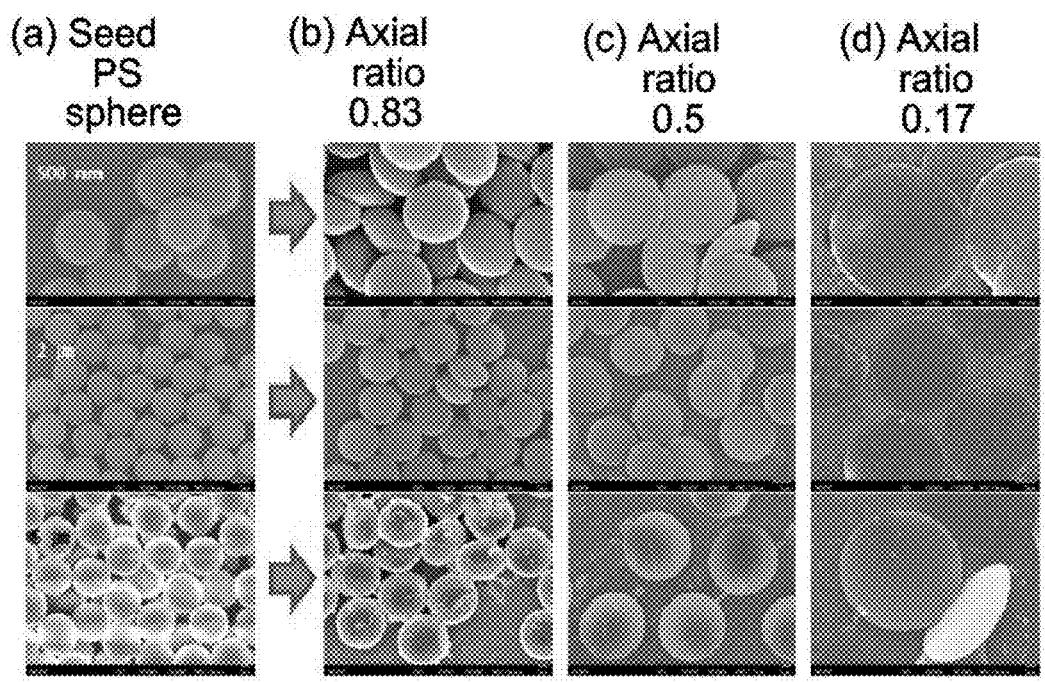
FIG. 6 is a photograph taken by SEM of oblate particles prepared by the method of the present invention.

FIG. 6 shows results of the oblate polystyrene particles prepared by the above example under the three squeezing conditions of the axial length ratios of 0.83, 0.5, and 0.17 as taken by a scanning electron microscope (Jeol, Japan). According to FIG. 6, the polystyrene microspheres before being squeezed (a) were all uniformly deformed into particles of oblate shape when squeezed slightly (b), squeezed to a medium degree (c), and squeezed a lot (d), and the shapes thereof were also confirmed to be uniform.

Test Example 2: Analysis of a Change in The Shape of a Second Polymer Film

Figure 7:
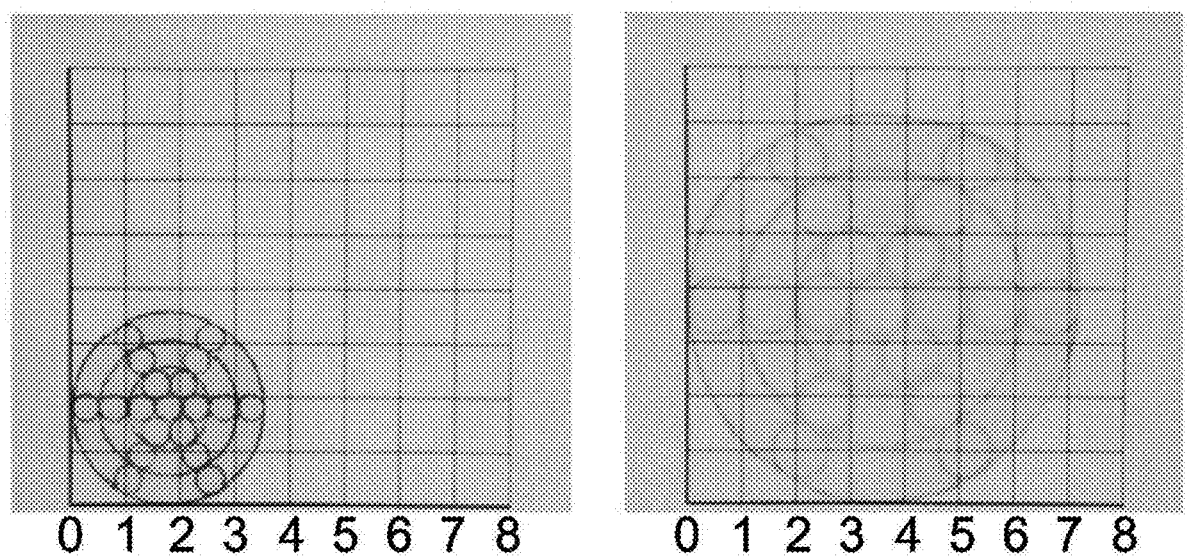
FIGS. 7 to 9 are photographs of various shapes of the second polymer film of the present invention before and after the squeezing.
Figure 8:
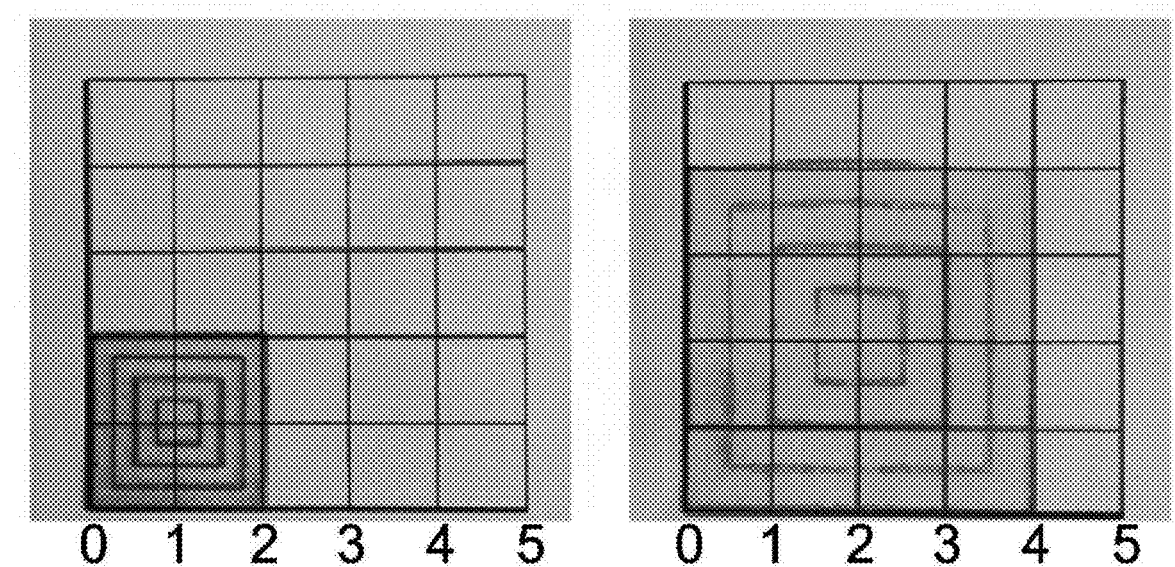
Figure 9:
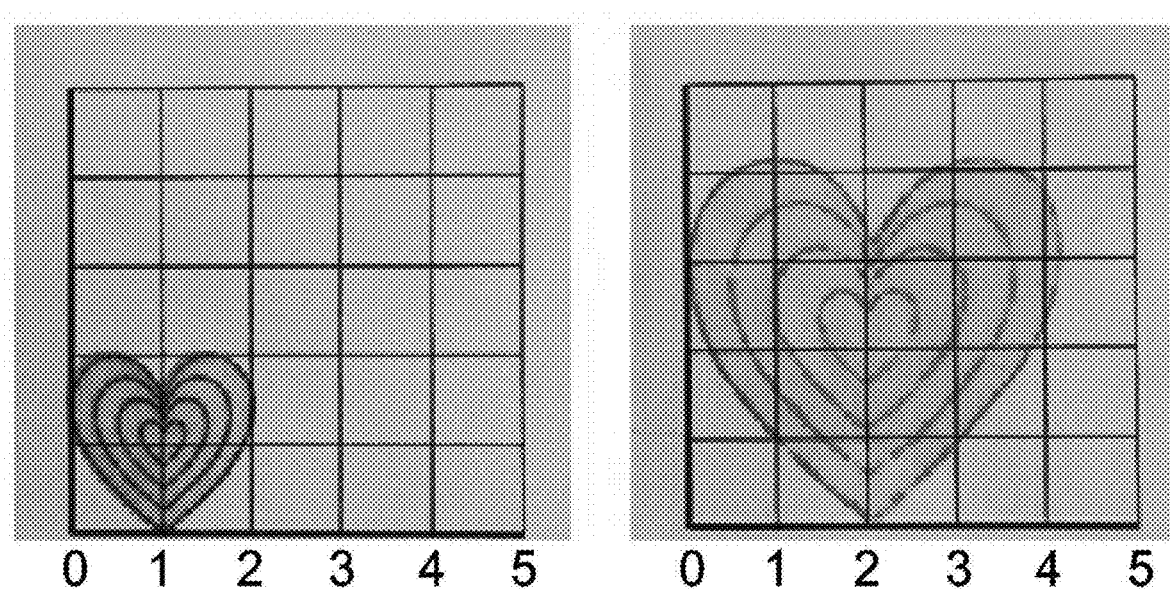

FIG. 7 is to confirm whether or not the squeezed second polymer film was uniformly squeezed over the entire film. Small circles having a diameter of 0.5 cm were drawn on a surface of the second polymer film before the squeezing, and the shapes of the circles drawn on the film were compared before and after the squeezing. After the squeezing, the circles drawn on the second polymer film had an average diameter of 1 cm, and were very uniformly deformed. The same result was obtained in the case in which a square was drawn on the second polymer film (FIG. 8), and in the case in which a heart shape was drawn (FIG. 9). That is, even when a film of various shapes other than a circle was squeezed and deformed, the film was uniformly deformed according to the original shape thereof. Both the film blowing method and the multi-direction stretching method, which are conventional technologies, are applicable only when the shape of a second polymer film has a circular shape. However, the present invention has the advantage in that a uniform deformation is achieved regardless of the shape of a second polymer film placed between third polymer sheets.

Figure 10:
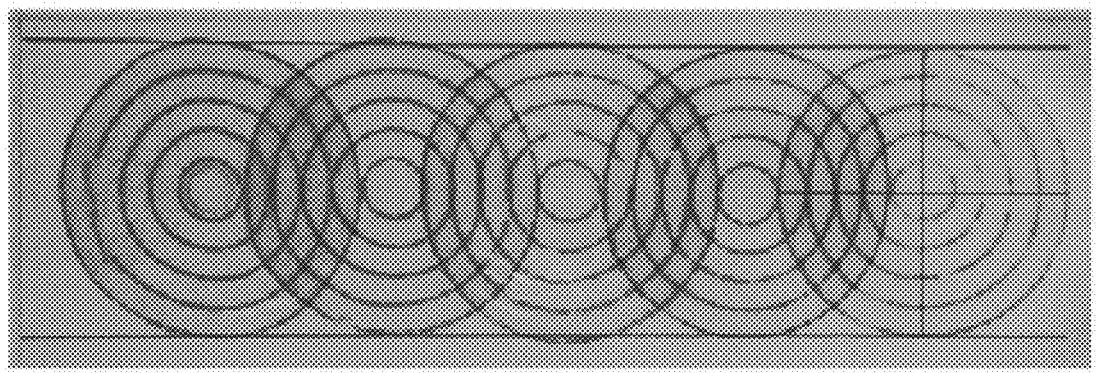
FIG. 10 is a photograph showing the reproducibility of the present invention.

Furthermore, FIG. 10 is a photograph confirming the reproducibility of the present invention in which five second polymer films were squeezed and deformed to be superimposed and photographed. It can be confirmed from FIG. 10 that the second polymer film is always deformed to a uniform size. The reason for the uniform deformation of the film is that the two silicone rubber sheets help to uniformly deform the film.

Figure 11:
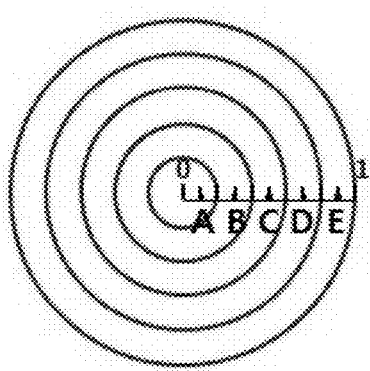
FIG. 11 is a photograph taken by SEM of the first polymer particles recovered from various positions of the second polymer film of the present invention.
Figure 11:
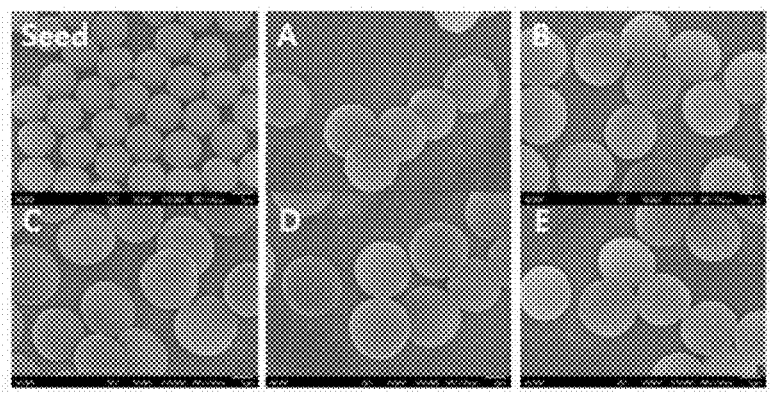

Test Example 3: Analysis of the Particle Shape According to the Position of a Second Polymer Film FIG. 11 is a photograph taken by SEM of the first polymer particles recovered from various positions of the second polymer film of the present invention. In order to more accurately confirm whether or not the first polymer particles in the second polymer film were uniformly deformed, the squeezed second polymer film were divided into 5 regions (A, B, C, D, and E), and particles from each region were recovered and the shapes thereof were confirmed using SEM. From this result, it was confirmed that the shape of the first polymer particles was always a uniform oblate ellipsoid regardless of the position thereof as moving outward from the center of the second polymer film.

Figure 12:
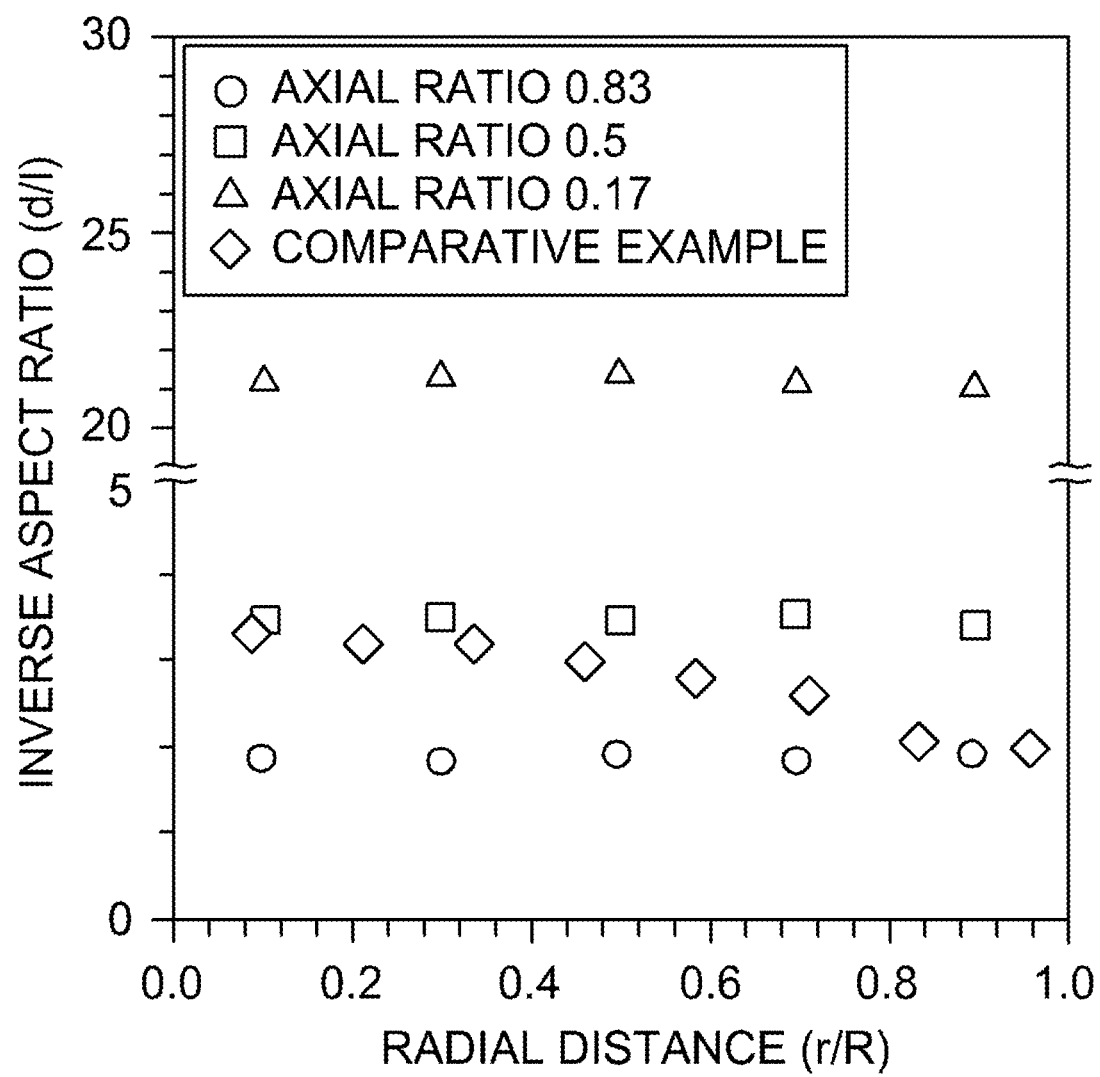
FIG. 12 is a graph analyzing the shapes of the first polymer particles recovered from various positions of the second polymer film of the present invention.

FIG. 12 is a graph analyzing the shapes of the first polymer particles recovered from various positions of the second polymer film of the present invention. The inverse aspect ratios of the first polymer particles obtained from each region of the deformed second polymer film are shown in the graph. The comparative example in FIG. 12 shows the result of oblate ellipsoid particles prepared by the multi-direction stretching method, which is a previously introduced technology, and shows that the inverse aspect ratio is gradually decreased as moving outward from the center of the deformed second polymer film. However, oblate particles prepared by the method of the present invention showed a constant inverse aspect ratio of the first polymer particles within the entire region of the second polymer film regardless of the degree of squeezing. From this result, it could be confirmed that the present invention may prepare much more uniform oblate ellipsoid particles when compared with the multi-direction stretching method.

Although the preferred embodiment of the present invention has been described above, the present invention is not limited to the specific embodiments described above. It is to be understood by one of ordinary skill in the art that various changes and modifications can be made without departing from the gist of the present invention. Accordingly, the scope of the present invention should not be construed as being limited to the above-described embodiments, but should be determined by the equivalents of the claims and the claims.

What is claimed is:

1. A method for preparing oblate polymer particles, comprising the steps of:
   (A) preparing spherical polymer particles;
   (B) preparing a polymer film including the spherical polymer particles;
   (C) adhering polymer sheets to both sides of the polymer film to form a multi-layer structure;
   (D) heating the multi-layer structure to a temperature equal to or higher than the highest temperature of the respective glass transition temperatures of the polymer particle, the polymer film, and the polymer sheets, and lower than the lowest temperature of the respective melting temperatures thereof;
   (E) squeezing in a direction perpendicular to each polymer sheet and toward the polymer film of the multi-layer structure to deform the polymer particles into an oblate shape; and
   (F) dissolving the polymer film in a solvent to obtain the polymer particles of oblate shape.

2. The method of claim 1, further comprising, after the step (E) but before the step (F), a step of cooling the multi-layer structure to a temperature lower than the lower temperature of the respective glass transition temperatures of the polymer particles and the polymer film.

3. The method of claim 1, wherein the polymer sheets are elastic sheets.

4. The method of claim 1, wherein, in the multi-layer structure, the thickness of each polymer sheet is 0.1 to 100 times the thickness of the polymer film.

5. The method of claim 1, wherein, in the multi-layer structure, an edge of each polymer sheet corresponds to an edge of the polymer film, or includes an edge of the polymer film, and an area of each polymer sheet is 1 to 10 times the area of the polymer film.

6. The method of claim 1, wherein the thickness of the polymer film after the squeezing in the step (E) is 5 to 95% of the thickness before the squeezing.

7. The method of claim 1, wherein the solvent of the step (F) is insoluble in the spherical polymer particles and soluble in the polymer film.

8. The method of claim 1, wherein the solvent of the step (F) is water.

9. The method of claim 1, wherein the polymer sheets and the polymer film are formed of the same kind of polymer.

* * * * *